US011377584B1

(12) United States Patent
Almutairi et al.

(10) Patent No.: US 11,377,584 B1
(45) Date of Patent: Jul. 5, 2022

(54) NANODISSOLVER FOR IRON SULFIDE SCALE REMOVAL

(71) Applicant: Halliburton Energy Services, Inc., Houston, TX (US)

(72) Inventors: Saleh Haif Almutairi, Houston, TX (US); Yasmeen Hani Najm, Houston, TX (US); Azhar Ahmed Alhasawi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/238,772

(22) Filed: Apr. 23, 2021

(51) Int. Cl.
*C09K 8/532* (2006.01)
*B82Y 30/00* (2011.01)
*B82Y 40/00* (2011.01)

(52) U.S. Cl.
CPC .......... *C09K 8/532* (2013.01); *B82Y 30/00* (2013.01); *B82Y 40/00* (2013.01); *C09K 2208/10* (2013.01); *C09K 2208/32* (2013.01)

(58) Field of Classification Search
CPC . C09K 8/532; C09K 2208/10; C09K 2208/20
See application file for complete search history.

(56) References Cited

U.S. PATENT DOCUMENTS

| 8,715,612 | B2 | 5/2014 | Singh et al. |
| 9,783,728 | B2 | 10/2017 | Mahmoud et al. |
| 10,323,173 | B2 | 6/2019 | Mahmoud et al. |
| 10,501,679 | B2 | 12/2019 | Oduro et al. |
| 2012/0318515 | A1 | 12/2012 | Cawiezel et al. |
| 2018/0291284 | A1 | 10/2018 | Sommese et al. |
| 2018/0362834 | A1* | 12/2018 | Haghighi ........ C09K 8/88 |
| 2019/0040300 | A1 | 2/2019 | Sun et al. |
| 2019/0367799 | A1 | 12/2019 | Gupta et al. |

FOREIGN PATENT DOCUMENTS

JP    2007-307478    11/2007

OTHER PUBLICATIONS

FerroGone TM 100 Iron Sulfide and Schmoo Dissolver Brochure, 2020.
FerroGone TM 100 Iron Sulfide and Schmoo Dissolver Product Data Bulletin, 2019.
Mallepally, Rajendar R.; Parrish, Chance C.; Mc Hugh, Mark A.M.; Ward, Kevin R. (2014). Hydrogen peroxide filled poly(methyl methacrylate) microcapsules: Potential oxygen delivery materials. International Journal of Pharmaceutics, 475(1-2), 130-137.
Khalil, Munawar; Jan, Badrul Mohamed; Tong, Chong Wen; Berawi, Mohammed Ali (2017). Advanced nanomaterials in oil and gas industry: Design, application and challenges. Applied Energy, 191( ), 287-310.

(Continued)

*Primary Examiner* — Aiqun Li
(74) *Attorney, Agent, or Firm* — Tenley Krueger; C. Tumey Law Group PLLC

(57) ABSTRACT

A method may include introducing into a wellbore a treatment fluid including a nanoparticle antiscalant; and a base fluid; contacting the nanoparticle antiscalant with an iron sulfide scale present in the wellbore; and dissolving at least a portion of the iron sulfide scale with the nanoparticle antiscalant.

18 Claims, 2 Drawing Sheets

(56) References Cited

OTHER PUBLICATIONS

A. Schippers; B.B. Jørgensen (2001). Oxidation of pyrite and iron sulfide by manganese dioxide in marine sediments. , 65(6), 0-922.
Baker Hughes—BHGE FORSA, Safety Data Sheet, Nov. 19, 2018.
Nu-Calgon—Liquid scale dissolver, Available at https://www.nucalgon.com/products/water-treatment/scale-removal/iquid-scale-dissolver/, Accesses Apr. 19, 2021.
Baker Hughes—Iron Sulfide control programs, Available at https://www.bakerhughes.com/integrated-well-services/integrated-well-construction/production/iron-sulfide-control, Accesses Apr. 19, 2021.
Halliburton/Multichem, Case Study, AcroClear® Batch Treatment Saves Operator Time and Money, May 2020.
International Search Report and Written Opinion for Application No. PCT/US2021/030908, dated Jan. 18, 2022.

\* cited by examiner

NANODISSOLVER FOR IRON SULFIDE SCALE REMOVAL

BACKGROUND

The deposition of inorganic materials such as iron sulfide scaling inside production systems may be a persistent problem in the production of oil and gas. Over time, deposition of scale within downhole tubulars may inhibit fluid movement by blocking and plugging flow paths which may reduce production rates and require remedial treatment.

There is currently no generic solution for treating iron sulfide scale buildup. Iron sulfide scales may be a challenge to remove due to their tendency to reform in solution after treatment and existing treatments rarely achieve full removal. Current treatments may only remove up to about 60% of scale. The descaling of these iron sulfide may include two methods including: mechanical removal and the chemical dissolution using mineral acids. Mechanical mitigation may oftentimes be laborious and time inefficient. Chemical treatment ineffective depending on the form of the iron sulfide deposit. With current technology, different methods and mixtures of chemicals may be required depending on the type of iron sulfide scale, and where along the pipeline or production tubing the scale is deposited.

Chemical treatment with mineral acids may also lead to metal corrosion and the production of toxic byproducts including hydrogen sulfide. Due to the $H_2S$ concerns, treatment fluids including organic acids such as acetic, formic, and/or maleic acids with chelating agents have been developed to treat iron sulfide scale. However, organic acids may not be not as effective in removing scale as mineral acids, and may require a longer contact time for effective treatment.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may relate to compositions and methods of removing iron sulfide scale from a wellbore, and particularly methods for removing scale deposits with a nanoparticle antiscalant. The deposition of iron sulfide particles on the internal surfaces of a wellbore including pipelines and associated process equipment lead to scale buildup. Iron sulfide scales may be deposited in layers along a tubular such that a sample of scale may include several forms of iron sulfide within a section of scale. The disparate chemistry of the layers of iron sulfide may preclude dissolution of the iron sulfide scale by mineral acid alone.

Iron sulfide scale may exist in six different types and mixtures of said types which may include: purrhotite ($Fe_7S_8$), troilite (FeS), marcasite ($FeS_2$), pyrite ($FeS_2$), greigite ($Fe_2S_4$), and mackinawite ($Fe_9S_8$). Partially due to the sulfur, iron sulfide scales may be hydrophobic on their surfaces, and may be coated with oil in the oleaginous wellbore environment. The hydrophobic nature of iron sulfide scales may prevent dissolution of the scale by aqueous acids as the aqueous carrier may be prevented from contacting the scale. Iron sulfide scales range from having a well-defined crystalline structure to amorphous species. Physical properties of the iron sulfide range from viscous gels to powders to fluffy crystals. Morphology of the iron sulfide scale may vary from needle-like structures to granular particles. The physical structure of the iron sulfide scale may be dependent upon the chemical identity of iron sulfide as well as the conditions which the iron sulfide formed, for example. Additional components of the iron sulfide may include heteroatoms such as carbon, oxygen, chlorine, calcium, and combinations thereof in varying weight percentages.

Figure 1:
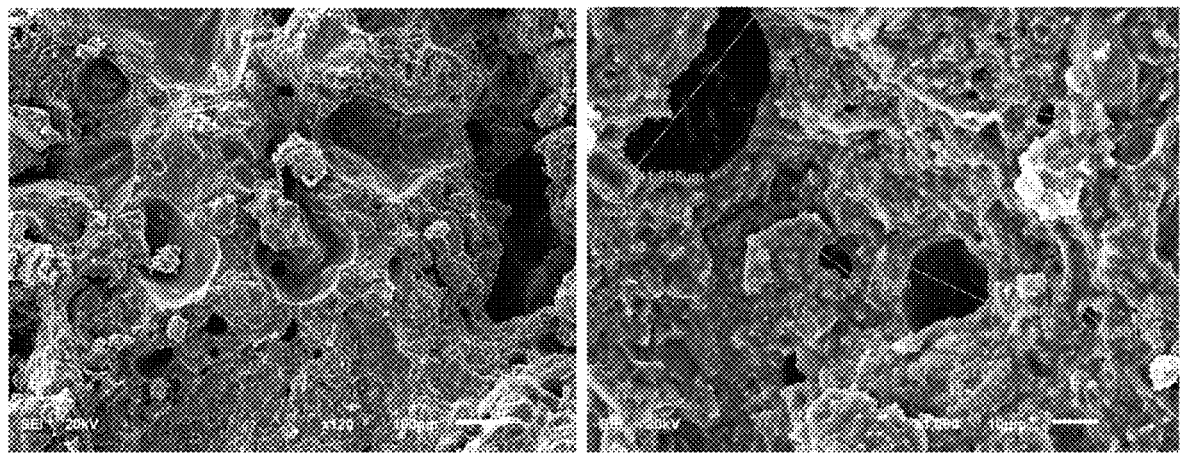
FIG. 1 is an SEM micrograph of iron sulfide scale.

FIG. 1 is an SEM micrograph of iron sulfide scale. As show in FIG. 1, iron sulfide scale may be porous and may include pores ranging from about 1 microns to about 400 microns in average diameter. The nanoparticle antiscalant of the present disclosure may migrate into the pores present in an iron sulfide scale which may then dissolve the iron sulfide internally through an oxidative reaction. Thus, the nanoparticle antiscalant may provide greater dissolution of iron sulfide scale than acid-based scale treatment fluids which are not able to penetrate into the layers of iron sulfide scale. Nanoparticle antiscalants may include transition metal peroxides capable of generating reactive oxygen species in solution. Nanoparticle antiscalants may include, but are not limited to, manganese dioxide ($MnO_2$), zinc peroxide ($ZnO_2$), and other transition metal peroxides capable of generating reactive oxygen species in solution. Nanoparticle antiscalants may have an average size in the range of about 1 nm to about 100 nm as measured along a major axis. Alternatively, nanoparticle antiscalant may have an average size of less than about 3 nm, less than about 10 nm, less than about 25 nm, less about 50 nm, or less than about 100 nm. Nanoparticles may be selected such that they are able to penetrate the pores of an iron sulfide-based scale. To avoid particle bridging effects, the diameter of the nanoparticles antiscalant may be selected to be ⅓ or less the diameter of the pores of the iron sulfide scale.

Nanoparticle antiscalants may penetrate the porous layers of the FeS scale and disintegrate the scale. The nanoparticle antiscalants may undergo a dissociative reaction in aqueous acidic medium to form transition metal ions and hydrogen peroxide. The dissociation of zinc nanoparticle antiscalant to form hydrogen peroxide is illustrated in Reaction 1.

Reaction 1
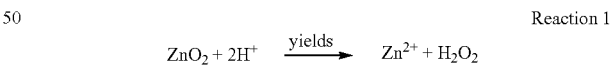

The hydrogen peroxide may further decompose by catalytically reacting with the $Zn^{2+}$ ion or other metals in solution to form water and oxygen via reaction 2.

Reaction 2
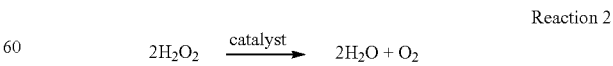

The oxygen generated may then react with the iron sulfide scale and produce soluble species. The reaction with oxygen may vary depending on the form of the iron sulfide. For pyrite, the reaction may be carried out in two steps as shown by Reactions 3 and 4.

Reaction 3

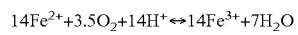

Reaction 4

Nanoparticles suitable as nanoparticle antiscalants may be readily synthesized by a number of methods. For example, the nanoparticle antiscalants may be synthesized by a gas-solid or a liquid-solid phase transformation. Other syntheses routes may include, but are not limited to, co-precipitation, sol-gel processing, microemulsion synthesis, and microfluidics. Microfluidics may continuously produce nanoparticle antiscalants. Example synthesis methods are discussed in the example section.

Nanoparticle antiscalants may be encapsulated by a polymer which may increase delivery of the nanoparticle antiscalants into the structure of scale. Encapsulation may allow for controlled release over time, and safer handling.

Various types of encapsulation may be employed such that the nanoparticle antiscalants retains its particulate nature and, thus, retains its ability to penetrate into the iron sulfide scale. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Exemplary water-dissolvable materials that may be utilized to encapsulate the nano-particles may include polyvinyl alcohol, for example.

For delivery into the wellbore, an antiscalant treatment fluid may be prepared. The antiscalant treatment fluid may include the nanoparticle antiscalant and a base fluid. The nanoparticle antiscalant may be any suitable nanoparticle antiscalant as described above. The nanoparticle antiscalant may be present in an amount of about 0.1 wt. % to about 15 wt. % by weight of the antiscalant treatment fluid. Alternatively, the nanoparticle antiscalant may be present in an amount of about 0.1 wt. % to about 1 wt. %, about 1 wt. % to about 5 w.t %, about 5 wt. % to about 12 wt. %, about 12 wt. % to about 15 wt. %, or any ranges therebetween by weight of the antiscalant treatment fluid. The base fluid may be any fluid suitable for use in a wellbore and capable of delivering the nanoparticle antiscalant. Suitable base fluids include, but are not limited to, oil-based fluids, aqueous-based fluids, aqueous-miscible fluids, water-in-oil emulsions, oil-in-water emulsions, and any combination thereof. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, produced water, wastewater, and any combination thereof. Suitable aqueous-miscible fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Any of the aforementioned base fluids, with or without additional additives, may further be used as a displacement fluid as described above. In some examples, the base fluid may include an aqueous acidic base fluid. The aqueous acidic base fluid may include any suitable acid including mineral acids such as sulfuric acid, hydrochloric acid, nitric acid, for example as well as organic acids such as carboxylic acids and sulfonic acids. In some examples, the aqueous acidic base fluid has a pH of less than 7, alternatively the aqueous acidic base fluid may have pH in the range of about pH 3- to about pH 4 or about pH 4-about pH 5. The acid in the aqueous acidic base fluid may react with the The treatment fluid may also include surface ligands such as organic ligands. Surface ligands may prevent self-assembled aggregation of the nanoparticle antiscalants when suspended in the treatment fluid. Self-assembled aggregation and mineralization may be due to nanoparticle surface instability from their high surface energy. Complexing metal cations of the surface ligands may allow nanoparticle antiscalant separation. The surface ligands may include, but are not limited to, ethylenediamine tetra acetic acid (EDTA), catechol amines (CA) or any suitable compound to facilitate nanoparticle antiscalant suspension in the treatment fluid. The surface ligands may be present in an amount of about 0.1 wt. % to about 15 wt. % by weight of the antiscalant treatment fluid. Alternatively, the surface ligands may be present in an amount of about 0.1 wt. % to about 1 wt. %, about 1 wt. % to about 5 w.t %, about 5 wt. % to about 12 wt. %, about 12 wt. % to about 15 wt. %, or any ranges therebetween by weight of the antiscalant treatment fluid. The surface ligands may include chelating agents. The chelating agent may be any suitable chelating agent which may complex with the disintegrated iron sulfide scales to facilitate removal. Suitable chelating agents include, but are not limited to, ethylenediamine tetra acetic acid (EDTA), hydroxyethyl ethylene diamine tetraacetic acid (HEDTA), hydroxyethyl iminodiacetic acid (HIDA), Glutamic acid N, N-diacetic acid (GLDA), Diethylene triamine Penta acetic acid (DTPA), Nitrilotriacetic acid (NTA), Methylglycinediacetic acid (MGDA), salts thereof, and combinations thereof. The chelating agent may be present in an amount of about 0.1 wt. % to about 15 wt. % by weight of the antiscalant treatment fluid. Alternatively, the chelating agent may be present in an amount of about 0.1 wt. % to about 1 wt. %, about 1 wt. % to about 5 w.t %, about 5 wt. % to about 12 wt. %, about 12 wt. % to about 15 wt. %, or any ranges therebetween by weight of the antiscalant treatment fluid.

The treatment fluid may also include any suitable additives that may serve a purpose other than delivery of the nanoparticle antiscalant and scale removal. Examples of suitable additives include, but are not limited to, a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a foaming agent, a gas, a pH control additive, a breaker, a biocide, a crosslinker, a stabilizer, a scale inhibitor, a gas hydrate inhibitor, a mutual solvent, an oxidizer, a reducer, a friction reducer, and any combination thereof.

The antiscalant treatment fluid may be used for removal of the iron sulfide scale in any suitable operation at any suitable stage of the wellbore's life, which include, but is not limited to well drilling and production. The antiscalant treatment fluid may be introduced into the wellbore and may remove any form of iron sulfide scale from any surface along the wellbore and associated processing equipment by making fluidic contact with the nanoparticle antiscalants. The nanoparticle antiscalants in the antiscalant treatment fluid may then penetrate the pores of the iron sulfide scale structure, and a localized oxidative reaction between the nanoparticle antiscalant and the FeS scale may occur, and may disintegrate the iron sulfide scale. A chelating agent may further stabilize the disintegrated iron sulfide scales in the solution to facilitate removal from the wellbore.

Figure 2:
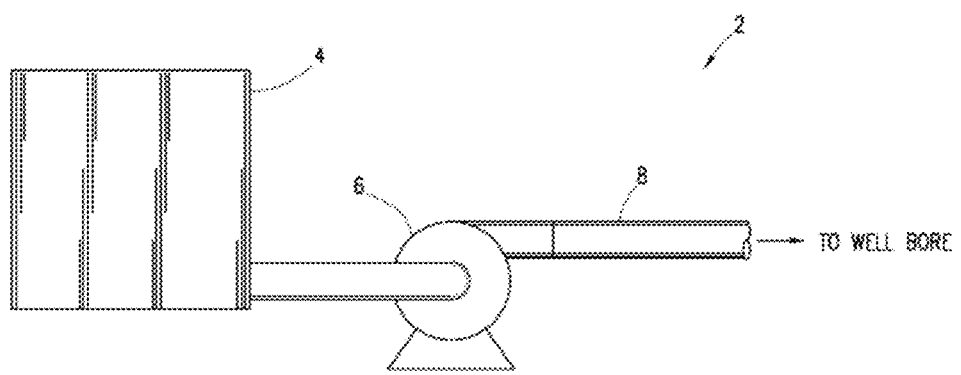
FIG. 2 is a schematic illustration for a fluid handling system for preparation and delivery of an antiscalant treatment fluid into a wellbore.

Example methods of using the nanoparticle antiscalant in an antiscalant treatment fluid may be described in more detail with reference to FIGS. 2 and 3. Referring to FIG. 2, a fluid handling system 2 is illustrated. The fluid handling system 2 may be used for preparing the antiscalant treatment fluid and introduction of the antiscalant treatment fluid into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, which both may be fluidically coupled with a wellbore supply conduit 8. The fluid supply 4 may contain the nanoparticle antiscalant, the antiscalant treatment fluid, or both. The pumping equipment 6 may be used to supply antiscalant treatment fluid from the fluid supply 4, which may include tank, reservoir, connections to external fluid supplies, and/or other suitable structures and equipment. While not illustrated, the fluid supply 4 may contain one or more components of the antiscalant treatment fluid in separate tanks or other containers that may be mixed at any desired time. Pumping equipment 6 may be fluidically coupled with the wellbore supply conduit 8 to communicate the sealant composition into wellbore. Fluid handling system 2 may also include surface and down-hole sensors (not shown) to measure pressure, rate, temperature and/or other parameters of treatment. Fluid handling system 2 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 2 or in a different manner, and may include additional or different features as appropriate. Fluid handling system 2 may be deployed via skid equipment, marine vessel deployed or may be comprised of sub-sea deployed equipment.

Figure 3:
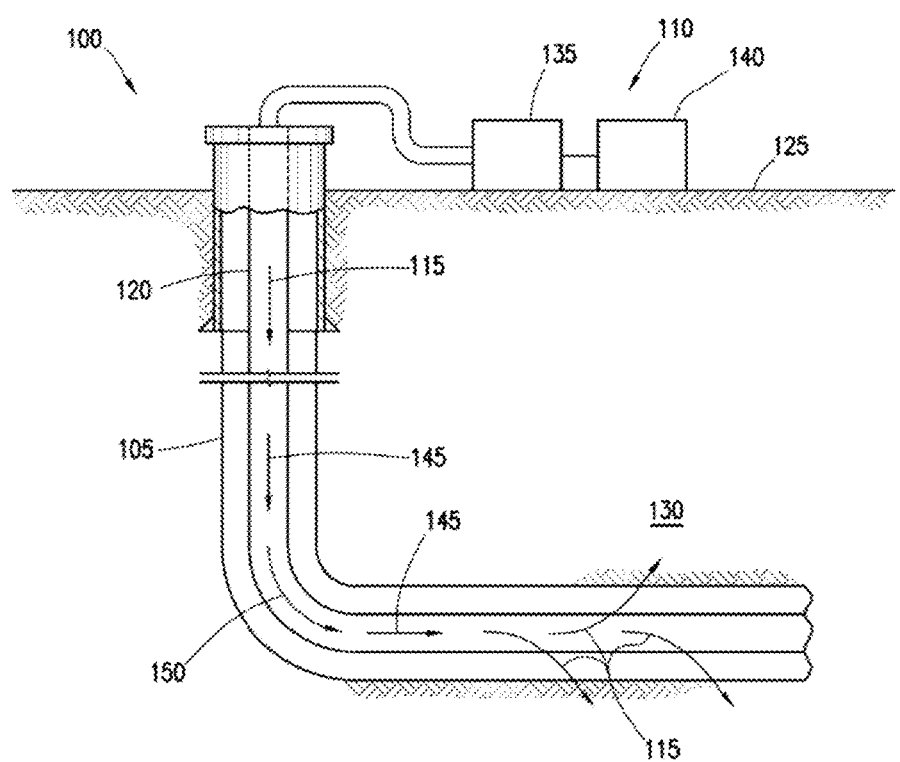
FIG. 3 is a schematic illustration for a fluid handling system for delivery of an antiscalant treatment fluid into a wellbore.

Turning now to FIG. 3, an example well system 100 for introduction of antiscalant treatment fluids described herein into a wellbore 105 is shown. As depicted in FIG. 3, system 100 may include a fluid handling system 110 for introducing an antiscalant treatment fluid 115 into the wellbore by way of tubular 120. Antiscalant treatment fluid 115 may include any nanoparticle antiscalant and additives disclosed herein in any desirable volume and concentration. In the illustrated embodiment, the fluid handling system 110 is above the surface 125 while wellbore 105 and tubular 120 are below the surface 125. The fluid handling system 110 can be configured in any suitable manner to the operation, and may include additional or different features as appropriate. The fluid handling system 110 may be deployed via skid equipment, marine vessel deployed or may be comprised of sub-sea deployed equipment.

As illustrated in FIG. 3, wellbore 105 may include vertical and horizontal sections. Generally, a wellbore 105 may include horizontal, vertical, slant, curved, and other types of wellbore geometries and orientations. Wellbore 105 may include a casing that is cemented or otherwise secured to the wellbore wall. Wellbore 105 can be uncased or include uncased sections. Fluid handling system 110 may include mobile vehicles, immobile installations, skids, hoses, tubes, fluid tanks or reservoirs, pumps, valves, and/or other suitable structures and equipment. For example, the fluid handling system 110 may include pumping equipment 135 and a fluid supply 140, which both may be in fluid communication with the tubular 120. The fluid supply 140 may contain the antiscalant treatment fluid 115. The pumping equipment 135 may be used to supply antiscalant treatment fluid 115 from the fluid supply 140, which may include tank, reservoir, connections to external fluid supplies, and/or other suitable structures and equipment. Pumping equipment 135 may be coupled to tubular 120 to communicate antiscalant treatment fluid 115 into wellbore 105. Fluid handling system 110 may also include surface and down-hole sensors (not shown) to measure pressure, rate, temperature and/or other parameters of treatment. Fluid handling system 110 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

Accordingly, the present disclosure may provide compositions and methods of removing iron sulfide scale from a wellbore, and particularly methods for removing scale deposits with a nanoparticle antiscalant. The methods compositions/tools may include any of the various features disclosed herein, including one or more of the following statements.

Statement 1. A method comprising: introducing into a wellbore a treatment fluid comprising: a nanoparticle antiscalant; and a base fluid; contacting the nanoparticle antiscalant with an iron sulfide scale present in the wellbore; and dissolving at least a portion of the iron sulfide scale with the nanoparticle antiscalant.

Statement 2. The method of statement 1, wherein the nanoparticle antiscalant comprises a transition metal peroxide.

Statement 3. The method of statement 2, wherein the transition metal peroxide comprises manganese dioxide ($MnO_2$), zinc peroxide ($ZnO_2$), or combinations thereof.

Statement 4. The method of any of statements 1-3, wherein the treatment fluid further comprises an organic ligand.

Statement 5. The method of statement 4, wherein the organic ligand is selected from the group consisting of EDTA, catechol amine (CA), and combinations thereof.

Statement 6. The method of claim 1, wherein the nanoparticle antiscalant has a particle size of about 1 nm to about 100 nm.

Statement 7. The method of any of statements 1-6, wherein the iron sulfide scale has a porosity of about 4 microns to about 400 microns.

Statement 8. The method of any of statements 1-7, wherein the treatment fluid further comprises a chelating agent.

Statement 9. The method of statement 8, wherein the chelating agent is selected from catechol amines (CA), ethylenediamine tetra acetic acid (EDTA), hydroxyethyl ethylene diamine tetraacetic acid (HEDTA), hydroxyethyl iminodiacetic acid (HIDA), Glutamic acid N, N-diacetic acid (GLDA), Diethylene triamine Penta acetic acid (DTPA), Nitrilotriacetic acid (NTA), Methylglycinediacetic acid (MGDA), salts thereof, and combinations thereof.

Statement 10. The method of any of statements 1-9, wherein the base fluid comprises an acidified aqueous fluid with a pH of about 4 to about 5.

Statement 11. A method comprising: preparing a treatment fluid comprising: a nanoparticle antiscalant; and an aqueous base fluid with a pH of about pH 4 to about pH 5; introducing the treatment fluid into a wellbore.

Statement 12. The treatment fluid of statement 11, further comprising an organic ligand.

Statement 13. The treatment fluid of statement 12, wherein the organic ligand is selected from the group consisting of EDTA, CA, or combinations thereof.

Statement 14. The treatment fluid of any of statements 11-13, wherein the nanoparticle antiscalant comprises a transition metal peroxide.

Statement 15. The treatment fluid of statement 14, wherein the transition metal peroxide is zinc peroxide ($ZnO_2$).

Statement 16. The treatment fluid of any of statements 11-15, wherein the nanoparticle antiscalant has a particle size of about 1 nm to about 100 nm.

Statement 17. The treatment fluid of any of statements 11-16, further comprising a chelating agent is selected from catechol amines (CA), ethylenediamine tetra acetic acid (EDTA), hydroxyethyl ethylene diamine tetraacetic acid (HEDTA), hydroxyethyl iminodiacetic acid (HIDA), Glutamic acid N, N-diacetic acid (GLDA), Diethylene triamine Penta acetic acid (DTPA), Nitrilotriacetic acid (NTA), Methylglycinediacetic acid (MGDA), salts thereof, and combinations thereof.

Statement 18. The treatment fluid of any of statements 11-17, wherein the nanoparticle antiscalant is polymerically encapsulated.

Statement 19. The treatment fluid of any of statements 11-18, wherein the base fluid further comprises oil-based fluids, aqueous-based fluids, aqueous-miscible fluids, water-in-oil emulsions, oil-in-water emulsions, and any combination thereof.

Statement 20. A method comprising: introducing into a wellbore a treatment fluid comprising: a zinc peroxide ($ZnO_2$) nanoparticle antiscalant; an organic ligand, wherein the $ZnO_2$ nanoparticle antiscalant and the organic ligand are present in a ratio of about 1:1 $ZnO_2$ nanoparticle antiscalant to organic ligand; and an aqueous base fluid with a pH of about pH 4 to about pH 5; and allowing the nanoparticle antiscalant to dissolve iron sulfide scale in the wellbore.

To facilitate a better understanding of the present invention, the following examples of certain aspects of some embodiments are given. In no way should the following examples be read to limit, or define, the entire scope of the disclosure.

EXAMPLES

The present invention is described below in further detail using specific examples. These examples are provided only for illustrative purposes and by no way limit the present invention.

Example 1

To synthesize the $ZnO_2$ nanoparticle antiscalant 0.46 g of zinc acetate di-hydrate (0.46 g) was dissolved in 12 mL of concentrated ammonia solution. While the mixture was gently stirred, 100 mL of hydrogen peroxide was slowly dropped (1 drop/second) using dropping funnel under anaerobic conditions to obtain zinc peroxide precipitate. The zinc peroxide precipitate was separated from the liquid with centrifugation and washed twice with ethanol and once with diethyl ether. The $ZnO_2$ nanoparticle antiscalant was dried under vacuum.

Example 2

In another example of $ZnO_2$ nanoparticle antiscalant synthesis, 3.58 g of zinc acetate di-hydrate was dissolved in 5 mL deionized water. Ammonia was added to the mixture until no precipitation was observe. Methanol was then added to the solution followed by sodium perborate dissolved in a ratio of 20:80 methanol:water mixture until pH reached 10. 100 mL of hydrogen peroxide was added to the solution and stirred overnight. The resulting $ZnO_2$ nanoparticle antiscalant was then collected by centrifugations and drying under vacuum.

Example 3

In another example of $ZnO_2$ nanoparticle antiscalant synthesis, 4.6 g zinc acetate di-hydrate was dissolved in 25 mL of deionized water. The mixtures was vigorously mixed in a Schlenck flask in airtight conditions. After 10 minutes, 2.8 g/25 mL potassium hydroxide was added to the solution, and vigorous mixing continued for an extra 35 minutes. Hydrogen peroxide was then added slowly over a period of one hour and more stirring for 3 hours. The $ZnO_2$ nanoparticle antiscalant was separated from the liquid with centrifugation and washed twice with ethanol and once with diethyl ether. The $ZnO_2$ nanoparticle antiscalant was dried under room temperature.

Example 4

Dissolution of FeS scale was tested by preparing an antiscalant treatment fluid. The treatment fluid was prepared by mixing 50 mg of $ZnO_2$ nanoparticle antiscalant and 50 mg of EDTA and catecholamines to 0.35 g FeS scale that was added to acidified deionized water with a pH 4. The solution was vigorously mixed for one hour. FeS scale completely disintegrated. A control was prepared by treating the FeS scale without the $ZnO_2$ nanoparticle antiscalant which resulted in no FeS scale disintegration.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method comprising:
   introducing into a wellbore a treatment fluid comprising:
   a nanoparticle antiscalant comprising a transition metal peroxide; and
   a base fluid;
   contacting the nanoparticle antiscalant with an iron sulfide scale present in the wellbore; and
   dissolving at least a portion of the iron sulfide scale with the nanoparticle antiscalant;
   wherein the transition metal peroxide comprises zinc peroxide ($ZnO_2$).

2. The method of claim 1, wherein the treatment fluid further comprises an organic ligand.

3. The method of claim 2, wherein the organic ligand is selected from the group consisting of ethylene diamine tetraacetic acid, catechol amine, and combinations thereof.

4. The method of claim 1, wherein the nanoparticle antiscalant has a particle size of about 1 nm to about 100 nm.

5. The method of claim 1, wherein the iron sulfide scale has a porosity of about 4 microns to about 400 microns.

6. The method of claim 1, wherein the treatment fluid further comprises a chelating agent.

7. The method of claim 6, wherein the chelating agent is selected from catechol amines (CA), ethylenediamine tetra acetic acid (EDTA), hydroxyethyl ethylene diamine tetraacetic acid (HEDTA), hydroxyethyl iminodiacetic acid (HIDA), Glutamic acid N, N-diacetic acid (GLDA), Diethylene triamine Penta acetic acid (DTPA), Nitrilotriacetic acid (NTA), Methylglycinediacetic acid (MGDA), salts thereof, and combinations thereof.

8. The method of claim 1, wherein the base fluid comprises an acidified aqueous fluid with a pH of about 4 to about 5.

9. The method of claim 1, wherein the treatment fluid further comprises a manganese dioxide ($MnO_2$) nanoparticle antiscalant.

10. A method comprising:
    preparing a treatment fluid comprising:
    a nanoparticle antiscalant comprising zinc peroxide ($ZnO_2$); and
    an aqueous base fluid with a pH of about pH 4 to about pH 5;
    introducing the treatment fluid into a wellbore.

11. The method of claim 10, wherein the treatment fluid further comprises an organic ligand.

12. The method of claim 11, wherein the organic ligand is selected from the group consisting of ethylenediaminetetraacetic acid, catechol amine, or combinations thereof.

13. The method of claim 10, wherein the nanoparticle antiscalant has a particle size of about 1 nm to about 100 nm.

14. The method of claim 10, further comprising a chelating agent is selected from catechol amines (CA), ethylenediamine tetra acetic acid (EDTA), hydroxyethyl ethylene diamine tetraacetic acid (HEDTA), hydroxyethyl iminodiacetic acid (HIDA), Glutamic acid N, N-diacetic acid (GLDA), Diethylene triamine Penta acetic acid (DTPA), Nitrilotriacetic acid (NTA), Methylglycinediacetic acid (MGDA), salts thereof, and combinations thereof.

15. The method of claim 10, wherein the nanoparticle antiscalant is polymerically encapsulated.

16. The method of claim 10, wherein the treatment fluid further comprises a manganese dioxide ($MnO_2$) nanoparticle antiscalant.

17. A method comprising:
    introducing into a wellbore a treatment fluid comprising:
    a zinc peroxide ($ZnO_2$) nanoparticle antiscalant;
    an organic ligand, wherein the $ZnO_2$ nanoparticle antiscalant and the organic ligand are present in a ratio of about 1:1 $ZnO_2$ nanoparticle antiscalant to organic ligand; and
    an aqueous base fluid with a pH of about pH 4 to about pH 5; and
    allowing the nanoparticle antiscalant to dissolve iron sulfide scale in the wellbore.

18. The method of claim 17, wherein the treatment fluid further comprises a manganese dioxide ($MnO_2$) nanoparticle antiscalant.

* * * * *